United States Patent Office 3,514,413
Patented May 26, 1970

3,514,413
STEAM TREATMENT OF CRYSTALLINE ALUMI-
NOSILICATE CATALYST COMPOSITIONS
Luther J. Reid, Jr., Audubon, N.J., assignor to Mobil Oil
Corporation, a corporation of New York
No Drawing. Filed Feb. 20, 1967, Ser. No. 617,081
Int. Cl. B01j 11/40
U.S. Cl. 252—455                    6 Claims

ABSTRACT OF THE DISCLOSURE

The present invention is concerned with providing a method for preparing selective hydrocarbon conversion crystalline aluminosilicate catalysts combined with a matrix material without steaming the entire composition in admixture. This is accomplished by steaming the crystalline aluminosilicate in admixture with minor amounts of an amorphous siliceous material before its incorporation with the matrix material.

BACKGROUND OF THE INVENTION

Field of the invention

This invention relates to an improved method for preparing a hydrocarbon conversion catalyst, and more particularly to a method for preparing a crystalline aluminosilicate catalyst in admixture with a matrix material.

Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and siilcon atoms to oxygen atoms is 1:2. The electrovalence of the tetrahedra containing aluminum is balanced by the inclusion in the crystal of a cation, for example, an alkal imetal or an alkaline earth metal cation. This can be expressed by formula wherein the ratio of Al to the number of the various cations, such as $Ca/2$, $Sr/2$, Na, K or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite Y (U.S. 3,130,007), zeolite K–G (U.S. 3,055,654), and zeolite ZK–5 (U.S. 3,247,195), merely to name a few.

Steam treatment of crystalline aluminosilicates is known to impart a number of advantages, as described in U.S. 3,140,253, including increased selectivity or the ability of a catalyst to control and direct the course of hydrocarbon conversion. Thus, one cracking catalyst is more selective than another when it leads to a larger yield of gasoline boiling range products and coincidently therewith to smaller yields of less desirable products like dry gas and coke.

Heretofore, cracking catalysts comprising crystalline aluminosilicates have been steamed while in association with a matrix or binder. Steaming of the aluminosilicate in the presence of the matrix involves the handling and treatment of a relatively large mass of material in view of the fact that, generally speaking, the matrix comprises a large proportion of the catalyst, frequently more than half. The requirement for steam is substantial, particularly when one considers that the treatment may extend for a number of hours. While attempts to prepare highly selective catalysts by steaming the aluminosilicate component alone, before inclusion in a matrix, have been made, these have not proven to be successful.

SUMMARY OF THE INVENTION

It is therefore, one of the principal objectives of this invention to provide a method for preparing a selective hydrocarbon conversion catalyst composition without the necessity of the steaming of the entire composition. In accordance with this objective there has now been discovered an improved method for preparing a selective hydrocarbon conversion catalyst composition comprising a crystalline aluminosilicate in admixture with a suitable porous matrix material which method comprises steaming the crystalline aluminosilicate in admixture with a minor amount of an amorphous siliceous material thereby inducing in the aluminosilicate material a shift in lattice contraction, which is measured by a displacement of its X-ray diffraction line of at least 50 percent. The resulting advantage achieved is that a highly selective hydrocarbon conversion catalyst composition is obtained when the steamed material is combined with the above-mentioned suitable matrix material without the necessity and expense of steaming relatively large amounts of material for relatively long periods of time.

DESCRIPTION OF SPECIFIC EMBODIMENTS

The crystalline aluminosilicates employed in preparation of the instant catalyst may be either natural or synthetic zeolites, having uniform pore openings which are capable of accepting the desired reactant, but preferably between about 6 and 15 angstrom units. Illustrative of particularly preferred zeolites are zeolite X, zeolite Y, zeolite L, zeolite T, zeolite K–G, zeolite ZK–5, faujasite, mordenite, erionite and gmelinite, merely to mention a few.

Considering the invention in more detail, it is applicable generally to positive ion-containing crystalline aluminosilicate formed, preferably, by substantially complete base exchange of a crystalline aluminosilicate starting material, such as an alkali metal or alkaline earth metal aluminosilicate, with a solution of an ionizable compound of a metal of Group I through Group VIII of the Periodic System, preferably a rare earth metal, or a metal like calcium, manganese, or magnesium, or mixtures thereof. Hydrogen, hydrogen precursors, or mixtures of the same are also suitable positive ions. The rare earths may include cerium, lanthanum, praseodymium, neodymium, samarium, and others as set forth in U.S. 3,210,267.

The conversion of the starting materials to crystalline aluminosilicates containing positive ions, particularly rare earth metal cations, is described in U.S. 3,140,251, 3,140,-252, 3,210,267, and 3,257,310, so that no further description is necessary beyond the statement that all or substantially all of the alkali metal cations of the starting zeolite are replaced by base exchange with, preferably, rare earth cations. Like the starting aluminosilicates from which they are derived, the resulting positive ion-containing crystalline aluminosilicates, which are preferably of the X or Y type, comprise three-dimensional framework structures of $SiO_4$ and $AlO_4$ tetrahedra in which the tetrahedra are cross-linked by the sharing of oxygen atoms. The Si—O bond is shorter than the Al—O bond, so that an increase in silica:alumina ratio would tend to be accompanied by a decrease in lattice parameter. In this connection the phenomenon of shift may be defined as a measure of the lattice contraction of the zeolite as its silica:alumina ratio increases. More particularly, the lattice parameter, $a_0$, decreases as the silica:alumina ratio increases. By definition, a type X zeolite having a silica:alumina ratio of 2.44 has a shift equal to 0%, while a type Y zeolite having a silica:alumina ratio of 5.28 has a shift equal to 100%.

The way the increase in percent shift that is used to characterize the crystalline aluminosilicate is measured is as follows:

First an X-ray goniometer tracing for the aluminosilicate containing material is determined using $CuK_\alpha$ radiation. A major peak or line near a Bragg angle $2\theta$ of 68° is located. For zeolite X having a silica to alumina ($SiO_2/Al_2O_3$) ratio of 2.44 such a line falls at 68° and this material is, as mentioned above, one of 0% shift. For zeolite Y of silica-alumina ratio 5.28 this diffraction line appears at an angle $2\theta$ of 69°. This latter material, as mentioned above, has a shift of 100%. Therefore, as the position of a line located near 68° changes position upward by 1° the shift increases 100%; and if it changes by more than 1° the shift increases to over 100% proportionally. Similarly, if the position of the line increased only 0.25°, the shift would increase only 25%.

If we were to take a material which has 50% shift due to its high silica to alumina ratio and steam it in the presence of amorphous silica alumina until the shift reaches 150%, we would say that the increase in shift is 100%.

In this invention the term "increase in shift" defines the displacement of the line located closest to the Bragg angle $2\theta$ of 68° toward higher angles. The "increase in shift," a term used in the claims, is calculated by the following relationship:

increase in shift =
{percent shift in aluminosilicate after treatment} − {percent shift in aluminosilicate before treatment}

As indicated, the zeolite material to be steamed with the amorphous siliceous material is in a "pure state," by which is meant that it consists substantially of positive ion-containing crystalline aluminosilicate. It may or may not have undergone any previous steaming or calcining treatment, since this is not critical to the operativeness of the invention.

The amorphous silica-containing material is preferably amorphous silica or amorphous silica-alumina in powdered form. Among others, the following materials are also useful, kaolin and montmorillonite. The amount of siliceous material is in minor amounts, ranging from 1 to 100% by weight of the zeolite, that is, minor with respect to the entire composition when in final form in a matrix. In some cases, a crystalline silicate or aluminosilicate may be employed provided it becomes substantially completely amorphous during the steaming operation. Many crystalline silicates and aluminosilicates (kaolin) are converted to the amorphous state by steaming, and therefore such materials are within the purview of the invention. Greater amounts of siliceous material may be used, however this is not necessary and considered uncritical to the invention.

The positive ion-containing aluminosilicate and the amorphous siliceous material are mixed together in any way suitable to effect adequate intermingling, and the mixture is then steamed. As described, a mild steam treatment is preferred, comprising subjecting the mixture to steam at about 1000 to 1400° F. and 15 to 30 p.s.i.a. for a period of about 0.01 to 100 hours, preferably about 1 to 24 hours. An atmosphere comprising from 10 to 100% by volume of steam is used, with the balance being air, flue gas, or an inert gas like carbon dioxide, nitrogen, or the like. A control over the extent of steaming is established by the desired increase in shift of at least 50% caused by lattice contraction. In other words, steaming is performed until the measured shift is higher than the shift of the starting material by at least 50 percent. The change in lattice parameter is determined directly by X-ray analysis and the amount of shift is obtained from a previously prepared plot involving lattice parameter, shift, and silica:alumina ratio as described above.

It has been found that once shift has been introduced into the positive ion-containing aluminosilicate, it can be further base exchanged, as by rare earth cations, without substantial loss of catalyst selectivity.

The steamed mixture of zeolite and amorphous siliceous material is then mixed with unsteamed porous matrix to form the finished catalyst. As the matrix component, a number of materials may be employed. The matrix materials may exhibit substantial catalytic activity. Various clays are suitable materials, including for example, bauxite, halloysite, illite, kaolinite, montmorillonite, polygorskite, and the like. The matrix may also comprise an inorganic oxide gel, such as silica, alumina, magnesia, zirconia, beryllia, titania, thoria, strontia, or the like and cogels such as silica-alumina or silica-alumina-zirconia gel. Various refractory metal oxides and silicates are also useful as matrix components including, for example, oxides or silicates of beryllium, magnesium, aluminum, titanium, zirconium, hafnium, thorium, vanadium, nickel, tantalum, chromium, molybdenum, etc. Porous metals, glasses, and various forms of porous carbon may also serve as a matrix for the active crystalline aluminosilicate component. It is also satisfactory to employ combinations of the noted matrix materials.

An inorganic oxide gel is preferable as a matrix for the crystalline aluminosilicate powder distributed therein. Silica gel, as will be evident from data hereinafter set forth, may be utilized as a suitable matrix. Also, the matrix employed may be a cogel of silica and an oxide of at least one metal selected from the group consisting of metals of Groups II–A, III–A, and IV–B of the Periodic Table. Such components include, for example, silica-alumina, silica-magnesia, silica-zirconia, silica-thoria, silica-beryllia, silica-titania, as well as ternary combinations such as silica-alumina-thoria, silica-alumina-zirconia, silica-alumina-magnesia, and silica-magnesia-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the other metal oxide content ranging from zero to 45 weight percent. Siliceous hydrogels utilized herein and hydrogels obtained therefrom may suitably be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and matrix may vary widely with crystalline aluminosilicate content ranging from about 1 to about 90 percent by weight and more usually, particularly where the composite is prepared in the form of beads, in the range of about 2 to about 50 percent by weight of the composite.

It will be apparent that the finished catalyst comprises a substantially pure positive ion-containing crystalline aluminosilicate that has been steamed per se to a point where it exhibits a shift due to lattice contraction of at least 50%, that there is present in the aluminosilicate an amorphous siliceous material which has been steamed with the said aluminosilicate, and that there is also present an unsteamed porous matrix of the type described. Preferably the aluminosilicate has the crystallographic structure of faujasite, and preferably, too, the positive ions include at least a substantial proportion of rare earth metal cations. The catalyst is of value for hydrocarbon conversions like catalytic cracking of gas oil and like stocks to produce gasoline boiling range products, catalytic hydrocracking, and other processes in which an acid type catalyst is beneficial.

The invention may be illustrated by the following example without limiting the invention thereto.

Example

Crystalline rare earth aluminosilicate, prepared by base exchanging sodium zeolite X with rare earth metal chloride solution, according to the method of U.S. 3,210,267, and containing 1.3% by weight of Na, was formed into pieces ½″ by ⅛″ and steamed for 24 hours at 1200° F. and 15 p.s.i.g. This material is identified in the table below as REX. A second quantity of the same rare earth exchanged zeolite X was mixed with an equal part by weight of amorphous silica-alumina fines of 4 microns average diameter, then formed into pieces of the same size and steamed as above. This material is identified in the table below as "REX plus amorphous silica-alumina material." Each of the foregoing steamed materials was then mixed with a matrix comprising kaolin and rare earth-exchanged bentonite to give two catalysts of approximately the same content, namely, 12.0 and 11.8% rare earth exchanged zeolite X, respectively, the balance porous matrix. Shift and catalyst selectivities were determined for the two catalysts and are reported in the following table.

|  | Catalyst REX plus amorphous silica-alumina material (with porous matrix) | Catalyst REX (with porous matrix) |
|---|---|---|
| Percent REX in clay catalyst | 11.8 | 12.0 |
| Increased shift in REX, percent [1] units | 50.0 | 35.0 |
| Cat-D results: |  |  |
|   Conversion, vol. percent | 63.0 | 55.2 |
|   Gasoline, vol. percent | 52.2 | 45.3 |
|   Dry Gas, wt. percent | 4.7 | 4.4 |
|   Coke, wt. percent | 3.9 | 4.0 |
| Selectivity: |  |  |
|   Δ to D-5 Std. Curves |  |  |
|   Gasoline, vol. percent | +1.4 | +0.2 |
|   Dry Gas, vol. percent | −1.1 | −0.5 |
|   Coke, wt. percent | +0.2 | +1.3 |

[1] Starting material has 0% shift, therefore the increase in shift units is numerically equal to the actual shift values of the steam treated materials.

The "Cat D" results are derived from the cracking of a Midcontinent gas oil, boiling at 450–950° F., which is pumped at 5 ml./min. through a 100 cc. bed of catalyst. The catalyst is maintained at 875° F. by external heat. The oil is vaporized and preheated to 875° F. before contact with the catalyst. Duration of the test is 10 min., LHSV is 3, and catalyst:oil ratio is 2. Reaction products are condensed and separated into $C_4$-free gasoline, a $C_4$ fraction, dry gas, and uncracked oil.

Measuring of the catalysts comprised comparing the various product yields to yields of the same products given by a commercially available cracking catalyst identified in the table as D-5. The differences (Δ values) represent the yields given by the present catalysts minus yields given by the commercial catalyst.

It will be seen from the table that catalyst "REX plus amorphous silica-alumina material," which exhibited a 50% shift, has better selectivity, i.e., higher gasoline yield, lower dry gas, and lower coke, than catalyst "REX/matrix," which exhibited only a 35% shift. It is also apparent that the former catalyst has better activity in catalyzing a higher conversion of gas oil.

What is claimed is:

1. In a method for making a selective hydrocarbon conversion catalyst composition comprising a positive-ion containing crystalline aluminosilicate zeolite in admixture with a porous matrix, the improvement which comprises incorporating between about 1 and about 100 percent by weight based on said zeolite of an amorphous siliceous material in said positive-ion containing crystalline aluminosilicate and subjecting the resulting mixture to steam treatment thereby inducing in said aluminosilicate an increase in shift of at least 50 percent due to the lattice contraction of said aluminosilicate, and thereafter incorporating the resultant steamed material into said porous matrix.

2. A method according to claim 1 wherein said positive ion is selected from the rare earth elements.

3. A method according to claim 2 wherein said crystalline aluminosilicate is selected from zeolite X and zeolite Y.

4. A method according to claim 1 wherein said steam treatment is at a temperature between about 1000° and 1400° F., and at a pressure between about 15 and about 30 p.s.i.a. for a period between about 0.01 and about 100 hours, and said steam is present in amount between about 10 and about 100 percent by volume.

5. A method according to claim 1 wherein said siliceous material is silica.

6. A method according to claim 1 wherein said siliceous material is silica-alumina.

References Cited

UNITED STATES PATENTS

| 3,335,099 | 8/1967 | Weisz | 252—455 |
| 3,391,088 | 7/1968 | Plank et al. | 252—455 |

DANIEL E. WYMAN, Primary Examiner

C. F. DEES, Assistant Examiner